UNITED STATES PATENT OFFICE.

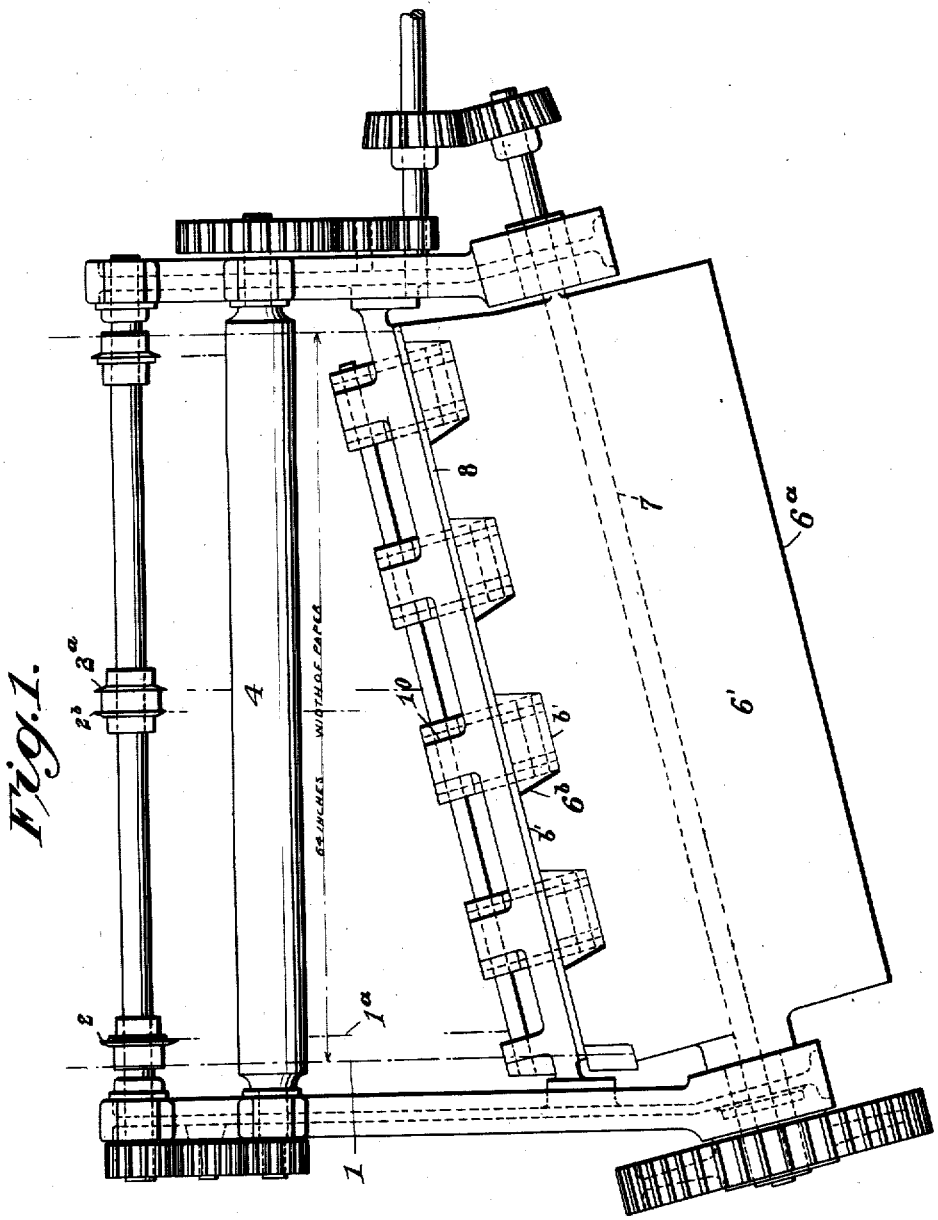

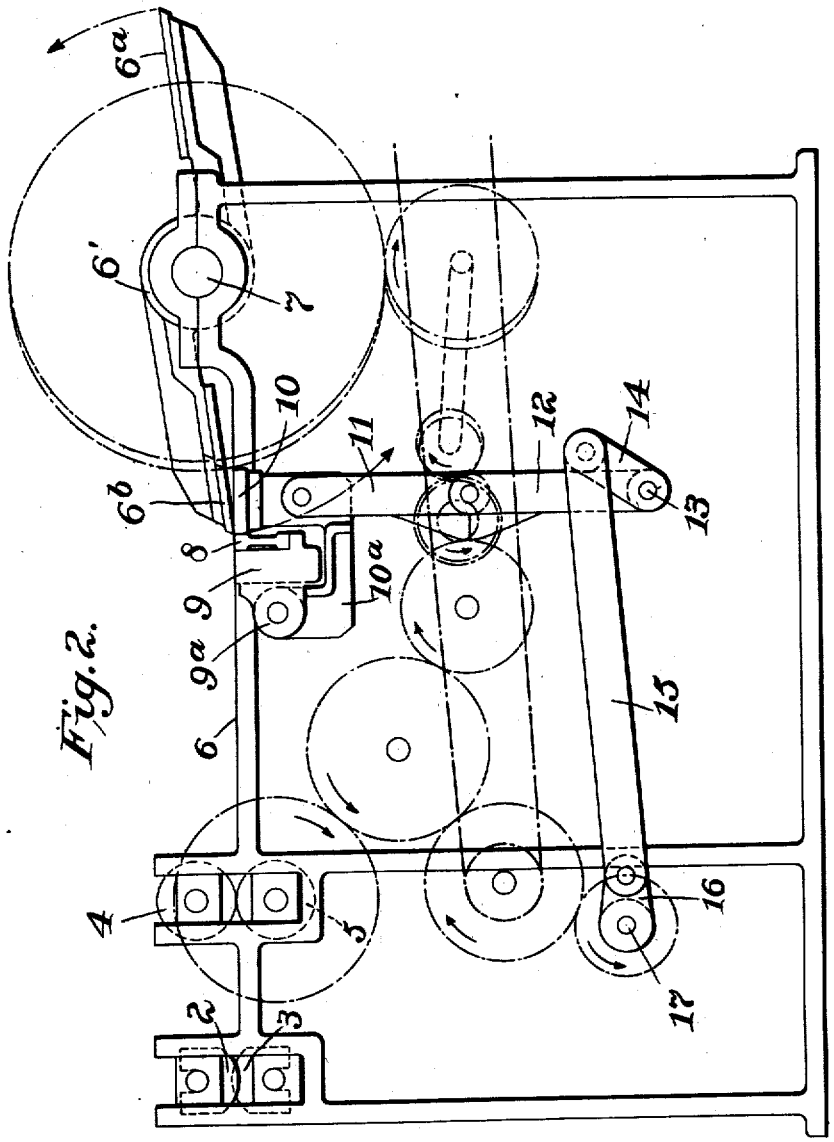

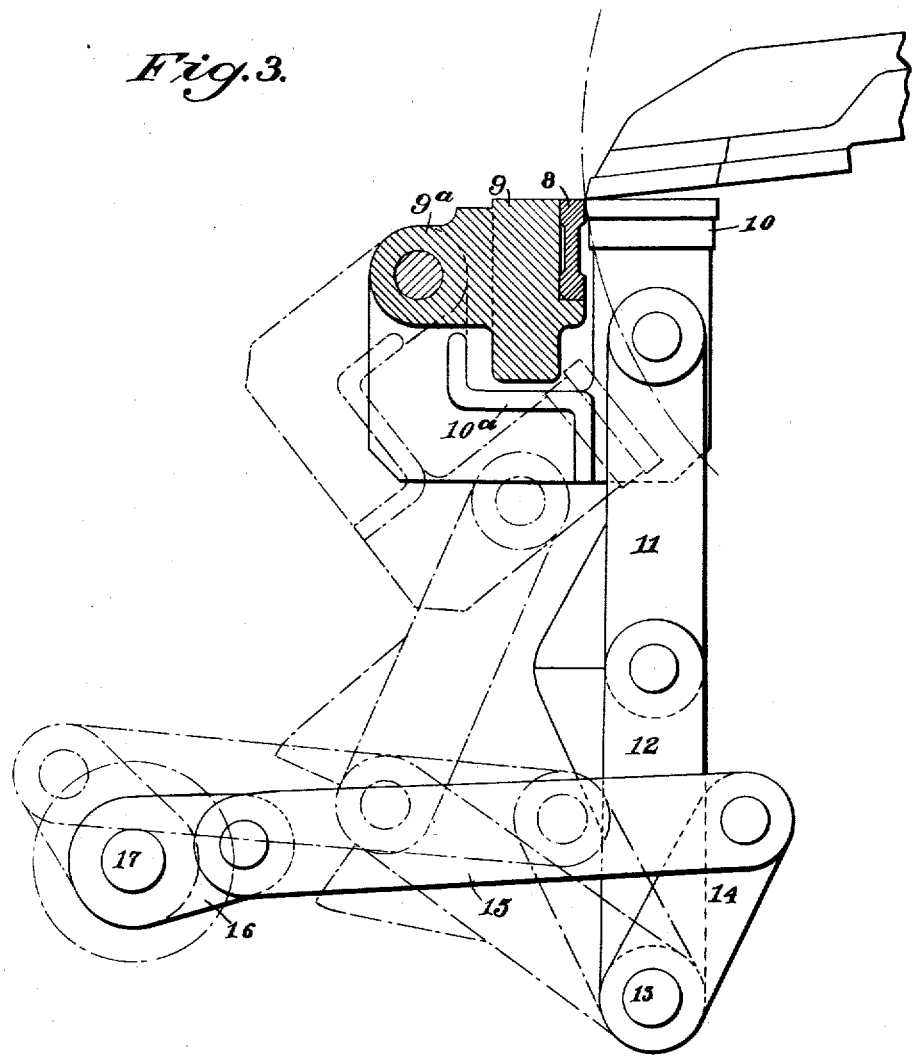

ALEXANDER S. SPEER, OF CHICAGO, ILLINOIS, ASSIGNOR TO THE ROOFING PATENTS COMPANY, A CORPORATION OF DELAWARE.

APPARATUS FOR CUTTING ROOFING-SHEETS 1,352,154. Specification of Letters Patent. Patented Sept. 7, 1920.

Application filed April 5, 1919. Serial No. 287,819.

*To all whom it may concern:*

Be it known that I, ALEXANDER S. SPEER, a citizen of the United States, and resident of Chicago, Illinois, have invented certain new and useful Improvements in Apparatus for Cutting Roofing-Sheets, of which the following is a specification.

My present invention relates to improvements in apparatus for cutting roofing slabs or shingles from sheets of composite material and the invention aims to provide a simple, economical and efficient machine which will cut such shingles or slabs with a minimum waste of material.

The invention includes the novel features of construction and arrangement of parts hereinafter described and particularly defined by the appended claims.

An embodiment of my invention is illustrated in the accompanying drawings, in which, Figure 1 is a plan view of a form of machine constructed in accordance with my invention.

Fig. 2 is a side elevation, and

Fig. 3 is a sectional detail.

My present machine is designed more especially for cutting roofing slabs having diagonal edges, such as disclosed in an application filed by me in the U. S. Patent Office on the 7th day of April, 1919, Serial Number 288,035, and is herein shown as designed to cut such slabs or shingles with rhomboidal projections on the lower edge or that edge of the shingle which is exposed when applied to a roof.

In the present drawings also the machine is shown for convenience as of a width to handle a strip or sheet of roofing material sixty-four inches wide and to cut therefrom two rows of slabs or shingles. Such a sheet of roofing material is indicated in the drawings at 1 and it is fed between upper and lower slitting rollers 2 and 3, which slit it in a manner and for a purpose hereinafter more fully set forth. Thence the sheet passes between the upper and lower feed rollers 4 and 5 to the feed table 6. To sever the sheet into slabs having one straight (upper) edge and one (lower) serrated or tongued edge I provide alternately acting cutters having respectively straight and irregular edges and these cutters coact with a correspondingly alternately changing die face which is held stationary during the cutting and severing operation. In the embodiment shown in the drawings I have shown a revolving cutter blade 6' mounted on a shaft 7 journaled in the frame of the machine and provided with one edge straight, as shown at 6ª, and the other edge irregular or shaped to provide the desired configuration on the other edge of the shingle, as shown at 6ᵇ. Various means might be provided to secure alternately positioned dies to coact with the alternately acting cutter blades, but the arrangement which I have deemed the simplest and herein shown is to provide a stationary straight shearing die or member 8 which may be conveniently removably supported by a die carrier 9 secured to or forming a part of the frame of the machine.

This die 8 coacts with the straight edge 6ª of the severing knife and also with the advanced portions $b$ of the edge 6ᵇ. For coöperating with the recessed portions $b'$ of the edge 6ᵇ I provide removable die members 10 which have curved shanks 10ª hinged to lugs 9ª on the bar 9 and these members 10 are connected by links 11 with arms 12 carried by a rock shaft 13.

Fast on this rock shaft is an arm 14 which is connected by pitman 15, with a crank arm 16 on shaft 17. This shaft 17 is continuously driven and so timed relative to the rotation of the cutter shaft 7 that the die members 10 are presented in position to coact with knife edge 6ᵇ and are withdrawn or dropped down out of the way to allow the straight die member 8 to coact with the straight knife edge 6ª.

It will thus be seen that at each half rotation of the cutter 6 the coöperating straight edges of the cutter and die cut the straight edges of shingles lying on both sides of the line of cut, and on the next half rotation the irregular cutting edge and die similarly form the serrated or irregular edges of the shingles on opposite sides of the line of cut.

To produce the diagonal edges to the slabs hereinbefore referred to I arrange the cutter shaft diagonal or inclined to the feed and preferably in such relation to the sheet that the side edges of the sheet will coincide with or form the sides of the terminal tongues on the serrated edge.

For shingles or slabs of some dimensions it is better to have the edge of the shingle offset slightly from the side wall of the tongue as indicated by the lines on the sheet of material where 1ᵇ designates the tongue and 1ᵃ the offset edge referred to. This is accomplished by the slitters 2 and 3 above referred to which are segments of circles and which coöperate to form isolated slits in the sheet prior to the action of the cutters and which slits define the end edges of the individual slabs or shingles. The central slitters designated 2ᵃ and 2ᵇ respectively are arranged so as to cut slits in staggered relation as shown.

The various moving parts are connected up by gearing as shown diagrammatically and may be driven from any suitable source of power, not shown.

Having thus described my invention what I claim is:

1. Apparatus of the character described comprising means for feeding a sheet of material, a pair of alternately acting cutters having different profiles, a stationary die for coöperating with one cutter, and supplemental die means movable into and out of juxtaposition to said stationary die for coöperating with the other cutter.

2. Apparatus of the class described comprising a pair of alternately acting cutters of different profile moving in substantially the same path, and die means having alternately changing profile to coöperate with said cutters.

3. Apparatus of the class described comprising a rotary shaft, a pair of cutting blades carried thereby, having cutting edges of different profile moving in substantially the same path, a stationary die coöperating with the edge of one blade, and supplemental die means moved into and out of juxtaposition to said stationary die to coöperate with the other blade.

4. Apparatus of the class described comprising a rotary shaft, a pair of cutting blades carried thereby, one having a straight blade and the other a notched blade, a straight edged stationary die member for coöperating with said straight edged cutter, and movable supplemental die means coöperating with said straight edged die to coact with said notched blade.

5. Apparatus of the class described comprising a rotary shaft, a pair of cutting blades carried thereby, one having a straight blade and the other a notched blade, a straight edged stationary die member for coöperating with said straight edged cutter, a plurality of supplemental die members, and means for moving them into juxtaposition to said straight edged die to coöperate with the notched blade.

6. Apparatus of the character described comprising sheet feeding means, a rotary shaft, a pair of cutting blades carried thereby, one having a straight edge and the other having its edge provided with flaring recesses, said shaft being disposed at an inclination to the line of feed corresponding to the inclination of the recess wall, a stationary die for coöperating with the straight edged cutter, and supplemental die means movable into and out of juxtaposition to said stationary die for coöperating with the notched blade.

7. Apparatus of the class described comprising a straight edged cutter and a recessed cutter with means for bringing them alternately into cutting position, a straight edged stationary die coöperating with said straight edged cutter, supplemental die means corresponding to the recesses of the second named cutter and hinged on fixed axes, and means for swinging said supplemental die means into juxtaposition to said stationary die to coöperate with said recessed cutter.

In testimony whereof I affix my signature.

ALEXANDER S. SPEER.

Witnesses:
Wᴍ. Hᴀʀᴛᴍᴀɴɴ,
A. J. Bʏʀᴏɴ.